United States Patent [19]

Nakacho et al.

[11] Patent Number: 5,494,982
[45] Date of Patent: Feb. 27, 1996

[54] PROCESS FOR PREPARING ETHYLENIC POLYMER COMPOSITION

[75] Inventors: Kenji Nakacho; Norio Shimakura; Tsutomu Akimaru; Tsuyoshi Ohta; Hideo Funabashi; Isamu Yamamoto, all of Ichihara, Japan

[73] Assignee: Idemitsu Petrochemical Company, Limited, Tokyo, Japan

[21] Appl. No.: 293,401

[22] Filed: Aug. 22, 1994

Related U.S. Application Data

[63] Continuation of Ser. No. 96,213, Jul. 19, 1993, abandoned, which is a continuation of Ser. No. 2,508, Jan. 4, 1993, abandoned, which is a continuation of Ser. No. 524,394, May 16, 1990, abandoned.

[30] Foreign Application Priority Data

May 19, 1989 [JP] Japan ................... 1-126303

[51] Int. Cl.⁶ ........................................ C08F 10/08
[52] U.S. Cl. .................... 526/65; 526/73; 526/114
[58] Field of Search .................. 526/73, 65, 114; 525/53

[56] References Cited

U.S. PATENT DOCUMENTS

| | | | |
|---|---|---|---|
| 3,049,529 | 8/1962 | Wicklatz et al. | 526/73 |
| 4,039,472 | 8/1977 | Hoff | 526/124 |
| 4,414,369 | 11/1983 | Kuroda et al. | 526/65 |
| 4,530,980 | 7/1985 | Radici | 526/73 |
| 4,798,866 | 1/1989 | Yoshitake et al. | 526/65 |
| 4,879,076 | 11/1989 | Sano et al. | 526/73 |

FOREIGN PATENT DOCUMENTS

| | | |
|---|---|---|
| 294319 | 5/1966 | Australia . |
| 0227838 | 7/1987 | European Pat. Off. . |
| 0294168 | 7/1988 | European Pat. Off. . |
| 2826548 | 1/1979 | Germany ............... 526/73 |
| 50-08758 | 4/1975 | Japan ..................... 526/73 |
| 50-85690 | 7/1975 | Japan . |
| 52-27677 | 7/1977 | Japan . |
| 56-8842 | 2/1981 | Japan . |
| 59-10724 | 3/1984 | Japan . |
| 59-115310 | 7/1984 | Japan . |
| 61-14207 | 1/1986 | Japan . |

OTHER PUBLICATIONS

European Search Report, EP 88304983, Feb. 9, 1988.
Database Chemical Abstracts, (HOST:SN) 1986, N0105(22):191814N, Columbus, & JP-A 61-130310, Jun. 18, 1986.
Database WPIL, No. 88-312282 (44), Derwent Publications, Ltd. London, & JP-A 63-230751, Sep. 27, 1988.
Chemical Abstracts, vol. 102, N020, May 1985, p. 40, Abstract N0167701R, Columbus, OH, & JP-A 59-227, 913, Dec. 21, 1984.
Database Chemical Abstracts, (HOST:SN) 1990, N0113(22):192171C, Columbus, OH, & JP-A 2-155906, Jun. 15, 1990.

*Primary Examiner*—Joseph L. Schofer
*Assistant Examiner*—Tom Weber
*Attorney, Agent, or Firm*—Armstrong, Westerman, Hattori, McLeland & Naughton

[57] ABSTRACT

A process for the preparation of an ethylenic polymer composition having excellent physical properties such as high impact properties, environmental stress cracking resistance, pinch-off fusing characteristics and having an intrinsic viscosity ranging from 3.2 to 4.5 dl/g and a density ranging from 0.943 g/cm³ to 0.958 g/cm³.

16 Claims, No Drawings

PROCESS FOR PREPARING ETHYLENIC POLYMER COMPOSITION

This application is a continuation of application Ser. No. 08/096,213, filed Jul. 19, 1993 now abandoned; which is a continuation of application Ser. No. 08/002,508 filed Jan. 4, 1993 now abandoned; which is a continuation of application Ser. No. 07/524,394 filed May 16, 1990 now abandoned.

BACKGROUND OF THE INVENTION

1. Field of the Invention

The present invention relates to a process for preparing an ethylenic polymer composition and, more particularly, to a process for preparing an ethylenic composition having excellent physical properties such as high impact properties, environmental stress cracking resistance (ESCR), pinch-off fusing characteristics, and so on.

2. Description of Related Art

As a process for preparing blow-molding polyethylene having a wide range of molecular weight distribution, is there a known two-stage polymerization method. Polyethylene prepared by the two-stage polymerization method are excellent in a balance between toughness and environmental stress cracking resistance (ESCR), compared with polyethylene prepared by one-stage polymerization method, however, the former has the drawbacks that a tolerance for a pinch-off shape of the mold is narrow because a fusing strength of the pinch-off portion of a hollow molding is small, and a ratio of defective products is high and that die swell is small.

In order to improve the drawbacks of the conventional two-stage polymerization method, Japanese Patent Examined Publication No. 10,724/1984 proposes a three-stage polymerization method. This three-stage polymerization method can improve the die swell for the resulting polyethylene to a sufficient extent, however, improvements in the pinch-off fusing characteristics are not sufficient yet. Further, the three-stage polymerization method presents the disadvantages that it uses three reaction vessels so that control of polymerization is so complicated and costs of equipment become expensive.

Japanese Patent Unexamined Publication No. 85,690/1985 and Japanese Patent Examined Publication No. 27,677/1987 propose processes for preparing alpha-olefin polymers using one polymerization vessel in the presence of a catalyst obtainable from an organometallic compound, a magnesium compound, a titanium compound and an aluminium compound.

As a result of comparative studies, it has been found that this polymerization process is difficult to provide a polymer having physical properties required for blow molding, such as high impact properties, ESCR, pinch-off fusing characteristics, and so on.

SUMMARY OF THE INVENTION

Therefore, the present invention has been performed under the circumstances as described hereinabove and has the object to provide a process for preparing an ethylenic polymer composition which is excellent in high impact properties, ESCR, pinch-off fusing characteristics and so on, as compared with the polyethylene prepared by the conventional one-stage polymerization method, and which is excellent particularly in pinch-off fusing characteristics, as compared with the polyethylene prepared by the three-stage polymerization method, and which can solve the problems of the two-stage polymerization method, such as a complicated operation for preparing the catalyst to be used therefor, a low activity per one transition metal, and a large amount of the metals left in the resulting polymer.

The present invention provides a process for preparing the ethylenic polymer composition with high productivity, which has physical properties suitable for hollow molding, in particularly excellent pinch-off fusing properties, die swell and appearance as well as high mechanical characteristics and ESCR, in a well balanced fashion, and which can be molded at high speeds.

In order to achieve the object, the present invention consists of a process for preparing an ethylenic polymer composition comprising a combination in any order of:

step (a) for preparing an ethylene homopolymer or copolymer at a rate ranging from 1 to 23% by weight with respect to the total polymerization amount at a temperature of 30° C. to 80° C., said ethylenic polymer or copolymer containing an alpha-olefin other than ethylene in an amount of 10% by weight or lower and having an intrinsic viscosity [η] of 10 dl/g to 40 dl/g; and step (b) for preparing an ethylene homopolymer or copolymer at a rate ranging from 77 to 99% by weight with respect to the total polymerization amount at a temperature of 60° C. to 100° C., said ethylenic polymer or copolymer containing an alpha-olefin other than ethylene in an amount of 10% by weight or lower and having an intrinsic viscosity [η] of 1.0 dl/g to 5.0 dl/g; in the presence of a catalyst obtainable from a solid catalyst component selected from a group consisting of a solid catalyst component obtainable from a magnesium alkoxide, a titanium compound and an organoaluminium halide, and a solid catalyst component containing at least titanium, zirconium, magnesium and a halogen, and an organoaluminium compound.

DESCRIPTION OF THE PREFERRED EMBODIMENTS

The process according to the present invention basically involves a particular two-step polymerization in preparing the ethylenic polymer composition by copolymerizing ethylene with an alpha-olefin other than ethylene in the presence of the catalyst obtainable from the solid catalyst component and the organoaluminium compound.

I. Catalyst

The catalyst to be used for the process according to the present invention may include:

(I) a catalyst obtainable from the solid catalyst component obtainable from the magnesium alkoxide, the titanium compound and the organoaluminium halide and the organoaluminium compound; and (II) a catalyst obtainable from the solid catalyst component containing at least titanium, zirconium, magnesium and the halogen and the organoaluminium compound.

Catalyst (I)

(1) Solid Catalyst Component

The solid catalyst component for the catalyst (I) may contain the magnesium alkoxide, the titanium compound and the organoaluminium halide.

(i) Magnesium alkoxide

The magnesium alkoxide to be used for the solid catalyst component may be represented by the following general formula [2]:

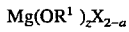  [1]

(wherein $R^1$ is a linear or branched alkyl, cycloalkyl, aryl or aralkyl group, each having from 1 to 10 carbon atoms;

X is a halogen atom such as fluorine, chlorine, bromine and so on; and a is a real number ranging from 1 to 2).

The magnesium alkoxide as represented by the general formula [1] may include, for example, an alkoxymagnesium halide, such as methoxymagnesium chloride, ethoxymagnesium chloride, ethoxymagnesium bromide, ethoxymagnesium iodide, propoxymagnesium chloride, isopropoxymagnesium chloride, butoxymagnesium chloride, sec-butoxymagnesium chloride, isobutoxymagnesium chloride, tert-butoxymagnesium chloride, pentyloxymagnesium chloride and hexyloxymagnesium chloride, a dialkoxymagnesium, such as dimethoxymagnesium, diethoxymagnesium, dipropoxymagneslum, diisopropoxymagnesium and dibutoxymagnesium, a diarylmagnesium, such as diphenoxymagnesium, a diaryloxymagnesium, such as dibenzyloxymagnesium, an alkoxyphenoxymagnesium, such as ethoxyphenoxymagnesium and butoxyphenoxymagnesium, and so on.

These magnesium alkoxides may be used singly or in combination of two or more.

Among the magnesium alkoxides, a magnesium alkoxide having a lower alkoxy group is preferred, and magnesium dimethoxide or magnesium diethoxide is preferred.

(ii) Titanium compound

The titanium compound to be used for the solid catalyst component may be represented by the following general formula [2]:

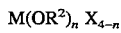  [2]

(wherein R is an alkyl, cycloalkyl, aryl or aralkyl group, each having from 1 to 20 carbon atoms;

M is a titanium atom;

X has the same meaning as above; and n is defined by: $0 \leq n \leq 4$).

Representatives of the titanium compounds as represented by the general formula [2] above may include: titanium tetrachloride and titanium tetrabromide, when n is 0; ethoxytrichlorotitanium, n-propoxytrichlorotitanium and n-butoxytrichlorotitanium, when n is 1; diethoxydichlorotitanium, di-n-propoxydichlorotitanium and di-n-butoxydichlorotitanium, when n is 2; triethoxymonochlorotitanium, tri-n-propoxymonochlorotitanium and tri-n-butoxymonochlorotitanium, when n is 3; and tetraethoxytitanium, tetra-n-propoxytitanium and tetra-n-butoxytitanium, when n is 4.

These titanium compounds may be used singly or in combination of two or more.

Among the titanium compounds, a alkoxytitanium having a lower alkoxy group is preferred, and tetra-n-butoxytitanium is preferred.

(iii) Organoaluminium halide:

The organoaluminium halide may include, for example, dimethylaluminium monochloride, diethylaluminium monochloride, diisopropylaluminium monochloride, diisobutylaluminium monochloride, methylaluminium dichloride, ethylaluminium dichloride, isopropylaluminium dichloride and isobutylaluminium dichloride.

The organoaluminium halide may be used singly or in combination of two or more.

Among the organoaluminium halides, a lower alkylaluminium halide is preferred, and ethylaluminium dichloride is more preferred.

(iv) Preparation of solid catalyst component

The solid catalyst component may be prepared by contacting the magnesium alkoxide, the titanium compound and the organoaluminium halide with each other.

In preparing the solid catalyst component, it is preferred that a molar ratio of the organoaluminium halide to the titanium compound may range from 1:1 to 100:1, preferably from 3:1 to 40:1 and that a molar ratio of the magnesium alkoxide to the titanium compound may range from 1:1 to 100:1, preferably from 2:1 to 40:1.

Although the order of contacting the components is not limited to a particular one, it is preferred that the magnesium alkoxide is first contacted with the titanium compound and then the resulting mixture is contacted with the organoaluminiumhalide.

They are contacted with each other usually in an inert solvent- The inert solvent may preferably include one or more of a hydrocarbon solvent selected from pentane, hexane, cyclohexane, heptane and so on.

It is preferred that the organoaluminium halide is gradually added so as to allow the reaction to proceed uniformly while keeping the temperature of the system at 10° C. to 50° C.

(2) Organoaluminium Compound

The resulting solid catalyst component is then contacted with the organoaluminium compound, thereby yielding the catalyst to be used for the polymerization.

The organoaluminium compound may include, for example, trimethylaluminium, triethylaluminium, triisopropylaluminium, triisobutylaluminium, diethylaluminium monochloride, diisopropylaluminium monochloride, diisobutylaluminiummonochloride, dioctylaluminium monochloride, ethylaluminium dichloride, diethylaluminium monoethoxide, isopropylaluminium dichloride, ethylaluminium sesquichloride and so on.

(3) Preparation of Catalyst

The catalyst to be used for the process according to the present invention may be prepared by contacting the solid catalyst component with the organoaluminium compound in conventional manner.

In preparing the catalyst, it is preferred to adjust an atomic ratio of the aluminium atom to the titanium atom in the solid catalyst component in the range usually from 1:1 to 1,000:1, preferably from 10:1 to 200:1.

It is further preferred to use a polymerization catalyst having an activity of 50 kg-PE/g.Ti or larger, preferably 100 kg-PE/g.Ti or larger.

Catalyst (II)

As the catalyst to be used for the polymerization, there may be used a binary-type transition metal catalyst containing Ti and Zr. More specifically, there may be used Ziegler-type catalysts, for example, as disclosed in Japanese Patent Unexamined Publication Nos. 12,006/1982 and 12,007/1982 or in Japanese Patent Application No. 137,712/1987.

Such catalysts may include:

(a) a catalyst containing a solid product (A1), as an effective ingredient, which may be obtainable by reacting a compound containing at least titanium, magnesium and a halogen with a tetraalkoxyzirconium and/or a zirconium tetrahalide and then reacting the resulting solid material with a halogen-containing titanium compound which may contain an alkoxy group, and the organoaluminium compound (B) as an effective ingredient;

(b) a catalyst containing a solid product (A2), as an effective ingredient, which may be obtainable by reacting a compound containing at least titanium, magnesium and a halogen with a tetraalkoxyzirconium and then reacting the resulting solid material with the organoaluminium halide, and the organoaluminium compound (B) as an effective ingredient; and (c) a catalyst consisting of a solid catalyst component (A3) prepared by contacting a mixture of a magnesium dialkoxide and a titanium tetraalkoxide with an alkanol such as isopropanol or the like to thereby yield a magnesium-containing composite which in turn is reacted with a tetraalkoxyzirconium or a zirconium tetrahalide or both and then by reacting the resulting reaction mixture with the organoaluminium halide and (B) the organoaluminium compound.

For these catalysts, it is noted that the molar ratio of Zr to Ti preferably ranges from 0.5:1 to 20:1.

As the compound containing at least titanium, magnesium and halogen, there may be enumerated, for example, a solid substance obtainable by reacting an inorganic magnesium compound such as magnesium oxide, magnesium hydroxide, magnesium carbonate, magnesium sulfate, a magnesium halide or the like with a titanium halide, a solid substance obtainable by reacting a variety of magnesium compounds with a silicon halide, an alcohol and a titanium halide in order, or a solid substance obtainable by reacting a dialkoxymagnesium such as magnesium diethoxide with magnesium sulfate and a titanium halide.

Furthermore, as the compound containing at least titanium, magnesium and halogen, there may also be used a solid substance obtainable by reacting an inorganic compound containing a Mg-O bond, such as magnesium oxide, magnesium hydroxide, magnesium carbonate or the like, with magnesium sulfate, a silicon halide and an alcohol in this order and then reacting the resulting precipitate with a silicon halide or an organosilicon compound, such as $SiCl_4$, $CH_3OSiCl_3$, $(CH_3O)_2SiCl_2$, $(CH_3O)_3SiCl$, $Si(OCH_3)_4$, $C_2H_5OSiCl_3$, $(C_2H_5O)_2SiCl_2$, $(Cl_2H_5O)_3$-$SiCl_2$, $Si(OC_2H_5)_4$ and so on. There may also be used a solid substance obtainable by reacting a dialkoxymagnesium with an alcohol-adduct of a magnesium halide such as $MgCl_2 \cdot 6C_2H_5OH$ and reacting the resulting product produced by treatment with an alcohol with the titanium halide.

As the halogen-containing titanium compound which may contain the alkoxy group, there may be exemplified $TiCl_4$, $TiBr_4$, $Ti(OCH_3)Cl_3$, $Ti(OC_2H_5)_2Cl_2$, $Ti(OC_2H_5)_3Cl$, and so on.

The organoaluminium compound may include, for example, trimethylaluminium, triethylaluminium, triisopropylaluminium, triisobutylaluminium, diethylaluminium monochloride, diisopropylaluminiummonochloride, diisobutylaluminium monochloride, dioctylaluminium monochloride, ethylalnminium dichloride, diethylaluminium monoethoxide, isopropylaluminium dichloride, ethylaluminium sesquichloride and so on.

The organoaluminium halide may include, for example, dimethylaluminium monochloride, diethylaluminium monochloride, diisopropylaluminium monochloride, diisobutylaluminium monochloride, methylaluminium dichloride, ethylaluminium dichloride, isopropylaluminium dichloride and isobutylaluminium dichloride.

The titanium tetraalkoxide or zirconium alkoxide may be represented by the following general formula [3]:

$$M(OR^3)_4$$

(where $R^3$ is an alkyl group, a cycloalkyl group, an aryl group or an aralkyl group, each having from 1 to 20 carbon atoms; and M is titanium or zirconium).

The compound as represented by the general formula [3] may include, for example, tetraethoxytitanium, tetra(n-propoxy)titanium, tetra(n-butoxy)titanium, tetra(n-pentoxy)titanium, tetra(n-hexoxy)titaninm, tetra(n-heptoxy)titanium, tetra(n-octoxy)titanium, tetracyclopentoxytitanium, tetracyclohexoxytitanium, tetracycloheptoxytitanium, tetracyclooctoxytitanium, tetraphenoxytitanium and the zirconium compounds corresponding to the titanium compounds.

The catalyst (II) to be used for the present invention may be prepared by preparing the solid catalyst component using each of the ingredients as described hereinabove in conventional manner to thereby yield the solid catalyst component and contacting the solid catalyst component with the organoaluminium compound in conventional marker.

II. Polymerization

In accordance with the present invention, polymerization may be carried out using the catalyst as prepared hereinabove.

The process according to the present invention comprises polymerizing ethylene or copolymerizing ethylene with the alpha-olefin other than ethylene in two steps, one step involving a polymerization step for preparing a polymer having a higher molecular weight and the other step involving a polymerization step for preparing a polymer having a lower molecular weight.

As will be described in more detail hereinafter, the step (a) is a step for preparing the polymer having a higher molecular weight and the step (b) is a step for preparing the polymer having a lower molecular weight. Either of the step (a) or step (b) may first be carried out before the other.

Step (a)

The polymerization in the step (a) may be carried out at temperatures ranging from 30° C. to 80° C. If the polymerization temperature is too low, productivity may become too low. If the temperature is too high, it may be difficult to adjust the intrinsic viscosity $[\eta]$.

In the step (a), an ethylene homopolymer or an ethylene copolymer with the alpha-olefin other than ethylene [hereinafter referred to as component (A)] may be prepared such that it contains the alpha-olefin other than ethylene in an amount of 10% by weight or lower, preferably 5% by weight or lower, it has an intrinsic viscosity $[\eta]$ ranging from 10 dl/g to 40 dl/g, preferably from 15 dl/g to 30 dl/g, and it accounts for 1% to 23% by weight, preferably from 3% to 20% by weight, with respect to the total amount of polymerization.

When the content of the alpha-olefin other than ethylene exceeds the upper limit, an amount of ingredients soluble in the solvent may increase and toughness of the resulting ethylenic polymer composition also may decrease. Furthermore, too much of the alpha-olefin other than ethylene may make a continuous operation for a long period of time difficult.

The intrinsic viscosity $[\eta]$ below the lower limit may worsen the pinch-off fusing characteristics and the flowability of the resulting ethylenic polymer composition while the intrinsic viscosity [η] above the upper limit may reduce the high-impact properties and cause a large number of fish eyes on the resulting products.

As the alpha-olefin other than ethylene, there may be exemplified an alpha-olefin having from 3 to 10 carbon atoms, preferably from 3 to 8 carbon atoms, which may specifically include, for example, propylene, butene-1, hexene-1, octene-1 and so on.

As described hereinabove, the component (A) may be prepared in the step (a) at the rate which accounts for 1% to 23% by weight with respect to the total amount of polymerization. When this rate becomes too low, the pinch-off fusing properties and compatibility may be worsened. A too high rate of the component (A) may impair the properties for hollow molding.

Step (b)

The polymerization in the step (b) may be carried out at temperatures ranging from 60° C. to 100° C. If the polymerization temperature is too low, productivity may become too low. If the temperature is too high, a portion of the resulting polymer may be caused to be aggregated, thereby making it difficult to perform a continuous operation.

In the step (b), the ethylene homopolymer or the ethylene copolymer with the alpha-olefin other than ethylene [hereinafter referred to as component (B)] may be prepared such that it contains the alpha-olefin other than ethylene in an amount of 10% by weight or lower, preferably 3% by weight or lower, it has an intrinsic viscosity [η] ranging from 1.0 dl/g to 5.0 dl/g, preferably from 1.5 dl/g to 4.0 dl/g, and it accounts for 77% to 99% by weight with respect to the total amount of polymerization.

When the content of the alpha-olefin other than ethylene exceeds the upper limit, an amount of ingredients soluble in the solvent may increase, thereby worsening a balance between toughness and ESCR of the resulting ethylenic polymer composition. The intrinsic viscosity [η] below the lower limit may increase an amount of ingredients soluble in the solvent, while the intrinsic viscosity [η] above the upper limit may reduce flowability of the resulting ethylenic polymer composition.

As the alpha-olefin other than ethylene, there may be used the same one as used in the step (a) or one different from those as enumerated for the step (a), although use of the same kind is preferred.

As described hereinabove, the component (B) may be prepared in the step (b) at the rate which accounts for from 77% to 99% by weight, preferably from 80% to 97% by weight, with respect to the total amount of polymerization.

In the process according to the present invention, it is possible to change a balance between toughness and ESCR for the resulting ethylenic polymer composition by changing the content of the alpha-olefin other than ethylene. It may be noted that the ethylene homopolymer or copolymer having a better toughness can be obtained when no alpha-olefin other than ethylene is used in either of the step (a) or step (b), on the one hand, while the ethylene copolymer having a better ESCR can be obtained when the alpha-olefin other than ethylene is used in both step (a) and step (b), on the other hand.

Each of the steps (a) and (b) may be carried out by any polymerization, such as suspension polymerization, solution polymerization and gas phase polymerization, in a continuous or batch manner. In both steps (a) and (b), a solvent such as pentane, n-hexane, cyclohexane, heptane, benzene or toluene may be used.

III. Ethylenic Polymer Composition

The process according to the present invention may provide the ethylenic polymer composition having an intrinsic viscosity [η] ranging usually from 3.0 dl/g to 5.0 dl/g, preferably from 3.2 dl/g to 4.5 dl/g, a density ranging from 0.940 g/cm$^3$ to 0.961 g/cm$^3$, preferably from 0.943 g/cm$^3$ to 0.958 g/cm$^3$, more preferably from 0.950 g/cm$^3$ to 0.953 g/cm$^3$, and a melt index ranging from 0.01 to 0.08 g/10 minutes.

The ethylenic polymer composition having an intrinsic viscosity below the lower limit has its ESCR reduced and its hollow moldability worsened and causes a number of fish eyes, on the one hand, and the ethylenic polymer composition having an intrinsic viscosity above the upper limit is poor in hollow molding at high speeds, on the other hand. If the density is below the lower limit, toughness of the resulting composition may become too small and, if the density is above the upper limit, ESCR may be reduced.

The ethylenic polymer composition prepared by the process according to the present invention has two peaks of a molecular weight distribution, one peak for a polymer having a higher molecular weight and the other for a polymer having a lower molecular weight.

The ethylenic polymer composition thus prepared is excellent in large blow molding, great in pinch-off fusing characteristics and die swell, remarkable in appearance, and large in flowability, so that it has an excellent moldability at high speeds. It also has a greater melt tension so that a cut of a parison can be prevented. Furthermore, the ethylenic polymer composition and moldings formed therefrom have a good balance between high ESCR and high toughness and they are excellent in high-impact properties.

It is further to be noted that the ethylenic polymer composition prepared by the process according to the present invention are also excellent as a material for inflation molding as well as for large-scale blow molding and as a material for covering steel pipes.

Furthermore, it is noted that the process according to the present invention can continuously prepare the ethylenic polymer composition with high efficiency, which is excellent in hollow molding, particularly in moldability at high speeds due to its large pinch-off fusing properties, large die swell, good appearance and flowability.

EXAMPLES

The present invention will be described in more detail by way of examples.

It is noted that the polymers prepared in examples and comparative examples are measured for their properties in the following way:

(1) Intrinsic viscosity: Measured at 135° C. in decalin.

(2) Density: JIS-K 7112

(3) ESCR: ASTM D-1693; temperature, 50° C.; surfactant ("NISSAN NONION" 10% aqueous solution; $F_{50}$ value)

(4) Tensile modulus: JIS-K 6760; temperature, 23° C.

(5) Melt tension: Melt tension meter (Toyo Seiki K.K.); orifice: D=2.10 mm, L=8.00 mm; temperature: 190° C.; falling velocity of plunger: 15 mm/minute; velocity of pulling thread: 10 rpm (6) Izod impact strength: ASTM D-256; notched; temperature: 23° C.

(7) Moldability: Molding machine: 10-liter accumulator with a die having a diameter of 90mm (manufactured by IHI); setting temperatures: C1, 180° C.; C2, 190° C.; C3, 200° C.; adapter, 220° C.; CH1, 220° C.; CH2, 220° C.; die, 220° C.; molding cycle, 5 minutes; load, 5 kg; Molded into a vessel which in turn is measured for its pinch-off thickness and thickness of its convex portion as follows:

(i) Pinch-off thickness: A central portion of the pinch-off portion of the vessel bottom was cut out at a right angle to the pinch-off portion and the minimum thickness of the pinch-off portion was measured with a slide gauge.

(ii) Convex thickness: A portion of the upper portion of the vessel close to the convex portion of a mold was cut out at a right angle to the pinch-off portion and its minimum thickness was measured with a slide gauge.

Example 1

(1) Preparation of solid catalyst component

A solution of 200 grams (0.6 mole) of tetra-n-butoxytitanium in 5 liters of hexane was added at 20° C. to 7 liters of a hexane slurry containing 890 grams (7.8 mole) of diethoxymagnesium. To this mixture, 9.4 liters of a 50% by weight hexane solution of ethylaluminium dichloride, while warming to 40° C. with stirring, were added over the period of 60 minutes, and the resulting mixture was reacted further for 120 minutes under reflux conditions. The resulting reaction mixture was washed well with dry hexane until no chlorine could be detected any more. Thereafter, the total volume was made 30 liters.

(2) Preparation of ethylenic polymer composition

A 200-liter polymerization reactor of the first stage was continuously charged with ethylene at the rate of 9 kg per hour, hexane at the rate of 26 liters per hour, butene-1 at the rate of 72 grams per hour and hydrogen so as to produce a polymer having the intrinsic viscosity as shown in Table 1 below. Furthermore, the reactor was then charged with the catalyst, prepared hereinabove, at the rate of 0.6 millimole per hour, when converted into Ti, and triisobutylaluminium at the rate of 18 millimole per hour. The mixture was subjected to polymerization at 80° C. and a residence time of 3 hours. The content of the first stage reactor was then transferred continuously at a given speed to a hydrogen-deaerating vessel.

After deaeration of hydrogen, the reaction mixture was then transferred to a 200-liter polymerization reactor of the second stage which in turn was continuously charged with ethylene at the rate of 1 kg per hour and hexane at the rate of 3 liters per hour. The mixture was then subjected to polymerization at a residence time of 2.5 hours and at a polymerization temperature so as to yield a polymer having the intrinsic viscosity as shown in Table 1 below.

After completion of the polymerization, the resulting ethylenic polymer was tested for its various physical properties.

The test results are shown in Table 2 below.

Example 2

The procedures of Example 1 was followed except for changing the polymerization conditions of the first stage and of the second stage to those as indicated in Table 1 below.

The physical properties of the resulting polymer are shown in Table 2 below.

Example 3

A 200-liter polymerization reactor of the first stage was continuously charged with ethylene at the rate of 1 kg per hour, hexane at the rate of 15 liters per hour, and butene-1 at the rate of 20 grams per hour. To this mixture were added the catalyst as prepared in Example 1 above at the rate of 0.6 millimole, when converted into Ti, and triisobutylaluminium at the rate of 18 millimole per hour.

The polymerization was carried out at a residence time of 4 hours and at the temperature so as to yield a polymer having the intrinsic viscosity as shown in Table 1 below.

The content of the first stage reactor was transferred continuously to a 200-liter polymerization vessel of the second stage at a given velocity.

The second stage reactor was continuously charged with ethylene at the rate of 9 kg per hour, hexane at the rate of 14 liters per hour, butene-I at the rate of 50 grams per hour, and hydrogen, and the polymerization was carried out at 80° C. and a residence time of 2.5 hours.

Example 4

The procedures of Example 3 was followed except for changing the polymerization conditions for the reactors of the first stage and of the second stage to those as indicated in Table 1 below.

The physical properties of the resulting polymer are shown in Table 2 below.

Comparative Example 1

(1) Preparation of solid catalyst component

A suspension was prepared by adding 1.0 kg (8.8 moles) of magnesium diethoxide and 1.5 kg (8.8 moles) of commercially available anhydrous magnesium sulfate to 50 ml of n-heptane. To this suspension were added 1.06 kg (8.8 moles) of silicon tetrachloride and 1.6 kg (35.2 moles) of ethanol, and the mixture was subjected to reaction at 80° C. over the period of 3 hours. After addition of 5 liters (45 moles) of titanium tetrachloride, the reaction was further continued at 98° C. for 3 hours. After completion of the reaction, the reaction mixture was cooled and the supernatant liquid resulting from standing was removed by decantation.

After addition of 100 liters of n-heptane, a washing operation consisting of stirring, standing and removal of the supernatant liquid was repeated three times. Thereafter, addition of 200 liters of n-heptane yielded dispersion of the solid catalyst component. The solid catalyst component was measured by colorimetry for its amount of titanium deposited thereon and it was found that the Ti amount was 42 mg-Ti/g-carrier.

(2) Preparation of ethylenic copolymer

Ethylenic copolymer was prepared in the same manner as in Example 3 except for feeding the solid catalyst component as prepared in item (1) above, as the catalyst component, at the rate of 1.8 millimoles per hour, when converted into Ti, diethylaluminium chloride at the rate of 49.7 millimoles per hour, and triethylaluminium at the rate of 4.3 millimoles per hour.

Comparative Example 2

A 200-liter polymerization reactor of the first stage was continuously charged with ethylene at the rate of 5 kg per hour, hexane at the rate of 15 liters per hour, and hydrogen so as to produce a polymer having the intrinsic viscosity as shown in Table 1 below. Furthermore, the reactor was then charged with the catalyst, as used in Example 1, at the rate of 0.5 millimole per hour, when converted into Ti, and triisobutylaluminium at the rate of 15.0 millimole per hour. The mixture was subjected to polymerization at 80° C. and a residence time of 4 hours. The content of the first stage reactor was then transferred continuously at a given speed to a hydrogen-deaerating vessel.

After deaeration of hydrogen, the reaction mixture was then transferred to a 200-liter polymerization reactor of the second stage which in turn was continuously charged with ethylene at the rate of 5 kg per hour, hexane at the rate of 15 liters per hour, butene-1 at the rate of 100 grams per hour, and hydrogen so as to yield a polymer having the intrinsic viscosity as shown in Table 1 below. The mixture was then subjected to polymerization at a residence time of 2.5 hours and the polymerization temperature at 80° C., thereby yielding an ethylene copolymer. It was then measured for its physical properties and they are shown in Table 2 below.

Comparative Example 3

The polymerization at the first stage was carried out using the same solid catalyst component as prepared in Comparative Example I above in the same manner as in Example 3. The resulting reaction mixture in the first stage reactor was continuously transferred at a given speed to a 200-liter polymerization reactor of the second stage. The first stage reactor was continuously charged with ethylene at the rate of 5 kg per hour, hexane at the rate of 2 liters per hour, and hydrogen so as to yield a polymer having the intrinsic viscosity as shown in Table 1 below. The polymerization was carried out at 80° C. and a residence time of 4 hours. After the content in the reactor was continuously transferred at a given speed to a hydrogen-deaerating vessel and hydrogen was deaerated, the reaction mixture was further transferred to a 200-liter polymerization reactor of the third stage which in turn was continuously charged with ethylene at the rate of 3.75 kg per hour, hexane at the rate of 12 liters per hour, butene-1 at the rate of 42 grams per hour, and hydrogen so as to produce a polymer having the intrinsic viscosity as shown in Table 1 below, thereby subjecting the mixture to polymerization at 80° C. and a residence time of 2.5 hours.

Comparative Example 4

A 200-liter polymerization reactor of the first stage was continuously charged with ethylene at the rate of 5 kg per hour, hexane at the rate of 15 liters per hour, and hydrogen so as to yield a polymer having the intrinsic viscosity as shown in Table 1 below. The first stage reactor was further charged continuously with the solid catalyst component, as used in Comparative Example 1, at the rate of 1.4 millimoles, when converted into Ti, diethylaluminium chloride at the rate of 39.2 millimoles per hour, and triethylaluminium at the rate of 3.4 millimoles per hour, and the polymerization was carried out at 80° C. and a residence time of 4 hours. After the content in the reactor was continuously transferred at a given speed to a hydrogen-deaerating vessel and hydrogen was deaerated, the reaction mixture was further transferred to a 200-liter polymerization reactor of the second stage which in turn was continuously charged with ethylene at the rate of 5 kg per hour, hexane at the rate of 15 liters per hour, butene-1 at the rate of 100 grams per hour, and hydrogen so as to produce a polymer having the intrinsic viscosity as shown in Table 1 below, thereby subjecting the mixture to polymerization at 80° C. and a residence time of 2.5 hours. Its measured physical properties are shown in Table 2 below.

Table 1 below indicates polymerization conditions of each step and Table 2 below indicates the results obtained by measurement for their physical properties of the ethylenic polymer compositions.

TABLE 1

| | FIRST STAGE | | | | SECOND STAGE | | | |
|---|---|---|---|---|---|---|---|---|
| | TEMP. °C. | INTRINSIC VISCOSITY | POLYMER- IZATION RATE | AMOUNT OF BUTENE 1 | TEMP. °C. | INTRINSIC VISCOSITY | POLYMER- IZATION RATE | AMOUNT OF BUTENE-1 |
| EX. 1 | 80 | 2.6 | 94 | 0.7 | 45 | 24 | 6 | 0 |
| EX. 2 | 80 | 2.7 | 94 | 0.7 | 50 | 20 | 6 | 0 |
| EX. 3 | 42 | 25 | 10 | 2.0 | 80 | 2.0 | 90 | 0.6 |
| EX. 4 | 50 | 20 | 10 | 2.0 | 80 | 2.5 | 90 | 0.7 |
| CO.EX. 1 | 38 | 25 | 10 | 0.5 | 80 | 2.0 | 90 | 0.8 |
| CO.EX. 2 | 80 | 2.0 | 50 | 0 | 80 | 5.9 | 50 | 2.0 |
| CO.EX. 3 | 38 | 25 | 10 | 0.5 | 80 | 0.7 | 50 | 0 |
| CO.EX. 4 | 80 | 2.0 | 50 | 0 | 80 | 5.9 | 50 | 2.0 |

| | THIRD STAGE | | | | FINAL STAGE | |
|---|---|---|---|---|---|---|
| | TEMP. °C. | INTRINSIC VISCOSITY | POLYMERIZATION RATE | AMOUNT OF BUTENE 1 | DENSITY, g/cm$^3$ | INTRINSIC VISCOSITY |
| EX. 1 | — | — | — | — | 0.952 | 3.45 |
| EX. 2 | — | — | — | — | 0.953 | 3.53 |
| EX. 3 | — | — | — | — | 0.950 | 3.93 |
| EX. 4 | — | — | — | — | 0.952 | 3.95 |
| CO.EX. 1 | — | — | — | — | 0.950 | 3.80 |
| CO.EX. 2 | — | — | — | — | 0.952 | 3.95 |
| CO.EX. 3 | 80 | 3.0 | 40 | 1.0 | 0.952 | 3.98 |
| CO.EX. 4 | — | — | — | — | 0.952 | 3.94 |

Intrinsic viscosity : dl/g
Polymerization ratio :rate of polymerization with respect to total amount of polymerization in each stage ( % by wt)
Amount of Butene-1 : ratio of polymerization of butene-1 with respect to amount of polymerization in each stage

TABLE 2

|  | PINCH-OFF THICKNESS (mm) | THICKNESS OF CONVEX PORTION (mm) | MELT ELASTICITY (g) | TENSILE MODULUS (kg/cm$^2$) | E S C R | IZOD IMPACT STRENGTH kg,cm/cm |
| --- | --- | --- | --- | --- | --- | --- |
| EX. 1 | 5.7 | 5.5 | 41 | 11900 | 210 | 70 |
| EX. 2 | 6.4 | 5.3 | 36 | 11400 | 350 | 66 |
| EX. 3 | 7.4 | 4.6 | 39 | 11800 | 600< | 56 |
| EX. 4 | 6.5 | 5.3 | 34 | 11300 | 600< | 70 |
| CO.EX. 1 | 4.5 | 3.8 | 36 | 11400 | 600< | 62 |
| CO.EX. 2 | 2.7 | 2.1 | 21 | 11400 | 600< | 80 |
| CO.EX. 3 | 2.9 | 2.2 | 34 | 12100 | 600< | 43 |
| CO.EX. 4 | 2.6 | 2.1 | 19 | 12000 | 600< | 72 |

Example 5

(1) Preparation of Mg-containing solid composite

To 10 liters of n-heptane were added 1 kg (3.8 moles) of diethoxymagnesium and 1.9 kg (5.6 moles) of tetra-n-butoxytitanium, and the mixture was heated at 100° C. for 3 hours, thereby producing a homogeneous solution which in turn was dropwise added at 20° C. over the period of 1 hour to 12 liters of propanol. After completion of the dropwise addition, the mixture was further stirred for additional 1 hour. The resulting solid was washed with dry hexane until no Ti could be detected in the washed solution. The resulting solid composite was found to have a specific surface area of 130 m$^2$ per gram and a titanium content of 0.62% by weight.

(2) Preparation of solid catalyst component

A solution of 450 grams (1.2 moles) of tetra-n-butoxyzirconium and 200 grams (0.6 mole) of tetra-n-butoxytitanium in 5 liters of hexane was dropwise added at 20° C. to the Mg-containing solid composite slurry, as obtained in item (1) above, over the period of 15 minutes with stirring. After completion of the dropwise addition, the reaction mixture was further reacted under reflux for 90 minutes. To this reaction mixture was dropwise added 10.2 liters of a 50% by weight hexane solution of ethylaluminium dichloride at 20° C. over the period of 30 minutes with stirring, and the resulting mixture was further reacted under reflux for 60 minutes after completion of the dropwise addition. The resulting solid catalyst component was washed well with dry hexane until no chlorine could be detected any more. Thereafter, the washing of the resulting product was repeated and the total hexane volume containing the solid catalyst component was made 50 liters. It was found that the Ti content and the Zr content in the solid catalyst component were 1.76% by weight-Ti and 6.10% by weight-Zr, respectively, when converted into the corresponding single metal.

(3) Ethylenic copolymer

A 200-liter polymerization reactor of the first stage was continuously charged with ethylene at the rate of 9 kg per hour, hexane at the rate of 26 liters per hour, butene-1 at the rate of 72 grams per hour and hydrogen so as to produce a polymer having the intrinsic viscosity as shown in Table 3 below. Furthermore, the reactor was then charged with the catalyst, prepared hereinabove, at the rate of 0.6 millimole per hour, when converted into Ti, and triisobutylaluminium at the rate of 18 millimole per hour. The mixture was subjected to polymerization at 80° C. and a residence time of 3 hours. The content of the first stage reactor was then transferred continuously at a given speed to a hydrogen-deaerating vessel.

After deaeration of hydrogen, the reaction mixture was then transferred to a 200-liter polymerization reactor of the second stage which in turn was continuously charged with ethylene at the rate of 1 kg per hour and hexane at the rate of 3 liters per hour. The mixture was then subjected to polymerization at a residence time of 2.5 hours and at a polymerization temperature so as to yield a polymer having the intrinsic viscosity as shown in Table 3 below.

After completion of the polymerization, the resulting ethylenic polymer was tested for its various physical properties.

The test results are shown in Table 4 below.

Examples 6–10

The procedures of Example 5 was followed except for changing the polymerization conditions of the first stage and of the second stage to those as indicated in Table 3 below.

The physical properties of the resulting polymer are shown in Table 4 below.

Example 11

A 200-liter polymerization reactor of the first stage was continuously charged with ethylene at the rate of 1 kg per hour, hexane at the rate of 15 liters per hour, butene-1 at the rate of 20 grams per hour and hydrogen and further with the catalyst, as used in Example B above, at the rate of 0.6 millimole per hour, when converted into Ti, and triisobutylaluminium at the rate of 18 millimole per hour. The mixture was subjected to polymerization at a residences time of 4 hours and at the temperature at which the polymer having the intrinsic viscosity as shown in Table 3 below was obtained. The reaction mixture in the first stage reactor was then transferred continuously at a given speed to a 200-liter polymerization reactor of the second stage which in turn was continuously charged with ethylene at the rate of 9 kg per hour, hexane at the rate of 14 liters per hour, butene-1 at the rate of 50 grams per hour, and hydrogen so as to yield the polymer having the intrinsic viscosity as shown in the table below. Then the mixture was subjected to polymerization at a residence time of 2.5 hours and at a polymerization temperature of 80° C.

Example 12

The procedures of Example 11 was followed except for changing the polymerization conditions for the reactors of the first stage and of the second stage to those as indicated in Table 3 below.

The physical properties of the resulting polymer are shown in Table 4 below.

Comparative Example 5

(1) Preparation of solid catalyst component

A suspension was prepared by adding 1.0 kg (8.8 moles) of magnesium diethoxide and 1.06 kg (8.8 moles) of commercially available anhydrous magnesium sulfate to 50 ml of n-heptane. To this suspension were added 1.5 kg (8.8 moles) of silicon tetrachloride and 1.6 kg (35.2 moles) of ethanol, and the mixture was subjected to reaction at 80° C. over the period of 1 hours. After addition of 5 liters (45 moles) of titanium tetrachloride, the reaction was further continued at 98° C. for 3 hour. After completion of the reaction, the reaction mixture was cooled and the supernatant liquid resulting from standing was removed by decantation. After addition of 100 liters of n-heptane and stirring, a washing operation consisting of stirring, standing and removal of the supernatant liquid was repeated three times. Thereafter, addition of 200 liters of n-heptane yielded dispersion of the solid catalyst component. The solid catalyst component was measured by colorimetry for its amount of titanium deposited thereon and it was found that the Ti amount was 42 mg-Ti/g-carrier.

(2) Preparation of ethylenic copolymer

Ethylenic copolymer was prepared in the same manner as in Example 11 except for feeding the solid catalyst component as prepared in item (1) above, as the catalyst component at the rate of 1.8 millimoles per hour, when converted into Ti, diethylaluminium chloride at the rate of 49.7 millimoles per hour, and triethylaluminium at the rate of 4.3 millimoles per hour.

Comparative Example 6

A 200-liter polymerization reactor of the first stage was continuously charged with ethylene at the rate of 5 kg per hour, hexane at the rate of 15 liters per hour, and hydrogen so as to yield a polymer having the intrinsic viscosity as shown in Table 3 below. The first stage reactor was further charged continuously with the solid catalyst component, as used in Comparative Example 5, at the rate of 0.5 millimoles, when converted into Ti, triisobutylaluminium chloride at the rate of 15.0 millimoles per hour, and the polymerization was carried out at 80° C. and a residence time of 4 hours. After the content in the reactor was continuously transferred at a given speed to a hydrogen-deaerating vessel and hydrogen was deaerated, the reaction mixture was further transferred to a 200-liter polymerization reactor of the second stage which in turn was continuously charged with ethylene at the rate of 5 kg per hour, hexane at the rate of 15 liters per hour, butene-1 at the rate of 100 grams per hour, and hydrogen so as to produce the ethylene copolymer having the intrinsic viscosity as shown in Table 3 below, thereby subjecting the mixture to polymerization at 80° C. and a residence time of 2.5 hours. Its measured physical properties are shown in Table 4 below.

Comparative Example 7

The polymerization at the first stage was carried out using the same solid catalyst component as prepared in Comparative Example 5 above in the same manner as in Example 11. The resulting reaction mixture in the first stage reactor was continuously transferred at a given speed to a 200-liter polymerization reactor of the second stage. The second stage reactor was continuously charged with ethylene at the rate of 5 kg per hour, hexane at the rate of 2 liters per hour, and hydrogen so as to yield a polymer having the intrinsic viscosity as shown in Table 3 below. The polymerization was carried out at 80° C. and a residence time of 4 hours. After the content in the reactor was continuously transferred at a given speed to a hydrogen-deaerating vessel and hydrogen was deaerated, the reaction mixture was further transferred to a 200-liter polymerization reactor of the third stage which in turn was continuously charged with ethylene at the rate of 3.75 kg per hour, hexane at the rate of 12 liters per hour, butene-1 at the rate of 42 grams per hour, and hydrogen so as to produce a polymer having the intrinsic viscosity as shown in Table 3 below, thereby subjecting the mixture to polymerization at 80° C. and a residence time of 2.5 hours.

Comparative Example 8

A 200-liter polymerization reactor of the first stage was continuously charged with ethylene at the rate of 5 kg per hour, hexane at the rate of 15 liters per hour, and hydrogen at the rate so as to yield a polymer having the intrinsic viscosity as shown in Table 3 below. The first stage reactor was further charged continuously with the solid catalyst component, as used in Comparative Example 5, at the rate of 1.4 millimoles, when converted into Ti, diethylaluminium chloride at the rate of 39.2 millimoles per hour, and triethylaluminium at the rate of 3.4 millimoles per hour, and polymerization was carried out at 80° C. and a residence time of 4 hours. After the content in the reactor was continuously transferred at a given speed to a hydrogen-deaerating vessel and hydrogen was deaerated, the reaction mixture was further transferred to a 200-liter polymerization reactor of the second stage which in turn was continuously charged with ethylene at the rate of 5 kg per hour, hexane at the rate of 15 liters per hour, butene-1 at the rate of 100 grams per hour, and hydrogen so as to produce a polymer having the intrinsic viscosity as shown in Table 3 below, thereby subjecting the mixture to polymerization at 80° C. and a residence time of 2.5 hours. Its measured physical properties are shown in Table 4 below.

TABLE 4

|  | PINCH-OFF THICKNESS (mm) | THICKNESS OF CONVEX PORTION (mm) | MELT ELASTICITY (g) | TENSILE MODULUS (kg/cm$^2$) | E S C R | IZOD IMPACT STRENGTH kg,cm/cm |
|---|---|---|---|---|---|---|
| EX. 5 | 5.9 | 4.5 | 42 | 11800 | 300 | 76 |
| EX. 6 | 5.8 | 5.4 | 40 | 11800 | 200 | 68 |
| EX. 7 | 6.5 | 5.4 | 34 | 11500 | 360 | 67 |
| EX. 8 | 6.0 | 4.9 | 35 | 10900 | 310 | 78 |
| EX. 9 | 6.1 | 4.5 | 40 | 11900 | 600< | 75 |
| EX. 10 | 5.9 | 5.5 | 38 | 11800 | 600< | 70 |
| EX. 11 | 7.5 | 4.6 | 30 | 11900 | 600< | 54 |
| EX. 12 | 6.6 | 5.4 | 28 | 11800 | 600< | 72 |

TABLE 4-continued

|  | PINCH-OFF THICKNESS (mm) | THICKNESS OF CONVEX PORTION (mm) | MELT ELASTICITY (g) | TENSILE MODULUS (kg/cm²) | E S C R | IZOD IMPACT STRENGTH kg,cm/cm |
|---|---|---|---|---|---|---|
| CO.EX. 5 | 4.6 | 3.9 | 28 | 11500 | 600< | 60 |
| CO.EX. 6 | 2.7 | 2.1 | 20 | 11400 | 600< | 81 |
| CO.EX. 7 | 2.9 | 2.2 | 23 | 12100 | 600< | 46 |
| CO.EX. 8 | 2.5 | 2.0 | 19 | 12000 | 600< | 70 |

As is apparent from the test results as indicated hereinabove, the ethylene polymers obtained in the above examples are superior in ESCR to those obtained in the above comparative examples.

As to the pinch-off fusing properties, the polymers obtained in the examples are higher and better in both pinch-off thickness and convex thickness and in melt elasticity, so that the pinch-off fusing properties of the polymers obtained by the process according to the present invention are superior to those of the polymers obtained in the comparative examples.

Concerning the high-impact characteristics, the polymers obtained by the process according to the present invention are superior in both Izod impact strength and tensile modulus to those obtained in the comparative examples.

What is claimed is:

1. A process for preparing an ethylenic polymer composition consisting essentially of a combination in any order of:

step (a) for preparing an ethylene homopolymer or copolymer at a rate ranging from 1 to 23% by weight with respect to the total polymerization amount at a temperature of 30° C. to 80° C., said ethylenic polymer or copolymer containing an alpha-olefin other than ethylene in an amount of 10% by weight or lower and having an intrinsic viscosity of 15 dl/g to 30 dl/g; and step (b) for preparing an ethylene homopolymer or copolymer at a rate ranging from 77 to 99% by weight with respect to the total polymerization amount at a temperature of 60° C. to 100° C., said ethylenic polymer or copolymer containing an alpha-olefin other than ethylene in an amount of 10% by weight or lower and having an intrinsic viscosity [η] of 1.0 dl/g to 5.0 dl/g;

steps (a) and (b) being conducted in the presence of a catalyst obtained from contacting a solid catalyst component with an organoaluminum compound, said solid catalyst component obtained by contacting a mixture of magnesium alkoxide with a lower alkoxytitanium with an alkanol to form a composite, reacting the solid composite with at least one of zirconium tetraalkoxide and zirconium tetrahalide to yield a reaction mixture, and further reacting the reaction mixture with an organoaluminum halide and such that essentially complete polymerization is achieved after completion of steps (a) and (b) to obtain an ethylenic polymer composition having a density ranging from 0.943 g/cm³ to 0.958 g/cm³, an intrinsic viscosity ranging from 3.2 dl/g to 4.5 dl/g, a melt index ranging from 0.01 to 0.08 g/10 minutes useful for inflation molding and large-scale blow molding.

2. A process for preparing an ethylenic polymer composition consisting essentially of a combination in any order of:

step (a) for preparing an ethylene homopolymer or copolymer a rate ranging from 1 to 23% by weight with respect to the total polymerization amount at a temperature of 30° C. to 80° C., said ethylenic polymer or copolymer containing an alpha-olefin other than ethylene in an amount of 10% by weight or lower and having an intrinsic viscosity [η] of 10 dl/g to 40 dl/g; and step (b) for preparing an ethylene homopolymer or copolymer at a rate ranging from 77 to 99% by weight with respect to the total polymerization amount at a temperature of 60° C. to 100° C., said ethylenic polymer or copolymer containing an alpha-olefin other than ethylene in an amount of 10% by weight or lower and having an intrinsic viscosity [η] of 1.0 dl/g to 5.0 dl/g;

steps (a) and (b) being conducted in the presence of a catalyst obtained from contacting a solid catalyst component with an organoaluminum compound, said solid catalyst component containing at least titanium, zirconium, magnesium and a halogen, and such that essentially complete polymerization is achieved after completion of steps (a) and (b) to obtain an ethylenic polymer composition having a density ranging from 0.943 g/cm³ to 0.958 g/cm³, an intrinsic viscosity ranging from 3.2 dl/g to 4.5 dl/g, a melt index ranging from 0.01 to 0.08 g/10 minutes useful for inflation molding and large-scale blow molding.

3. A process as claimed in claim 2, wherein the alpha-olefin is an alpha-olefin having from 3 to 10 carbon atoms.

4. A process as claimed in claim 2, wherein the alpha-olefin is an alpha-olefin having from 3 to 8 carbon atoms.

5. A process as claimed in claim 2, wherein the alpha-olefin is butene-1.

6. A process as claimed in claim 8, wherein an ethylene homopolymer is prepared in at least one of step (a) and step (b).

7. A process as claimed in claim 2, wherein an ethylene copolymer is prepared in step (a) and in step (b).

8. A process for preparing an ethylenic polymer composition consisting essentially of a combination in any order of:

step (a) for preparing an ethylene homopolymer or copolymer at a rate ranging from 1 to 23% by weight with respect to the total polymerization amount at a temperature of 30° C. to 80° C., said ethylenic polymer or copolymer containing an alpha-olefin other than ethylene in an amount of 10% by weight or lower and having an intrinsic viscosity [η] of 15 dl/g to 30 dl/g; and step (b) for preparing an ethylene homopolymer or copolymer at a rate ranging from 77 to 99% by weight with respect to the total polymerization amount at a temperature of 60° C. to 100° C., said ethylenic polymer or copolymer containing an alpha-olefin other than ethylene in an amount of 10% by weight or lower and having an intrinsic viscosity [η] of 1.0 dl/g to 5.0 dl/g;

steps (a) and (b) being conducted in the presence of a catalyst obtained from contacting a solid catalyst component with an organoaluminum compound, said solid catalyst component containing at least titanium, zirconium, magnesium and a halogen, and such that essentially complete polymerization is achieved after completion of steps (a) and (b) to obtain an ethylenic polymer composition having a density ranging from 0.943 g/cm$^3$ to 0.958 g/cm$^3$, an intrinsic viscosity ranging from 3.2 dl/g to 4.5 dl/g, a melt index ranging from 0.01 to 0.08 g/10 minutes useful for inflation molding and large-scale blow molding.

9. In a process for preparing an ethylenic polymer composition comprising polymerizing ethylene or ethylene with an alpha-olefin other than ethylene in the presence of a catalyst obtained from contacting a solid catalyst component obtained by contacting a mixture of magnesium alkoxide with a lower alkoxytitanium with an alkanol to form a composite, reacting the solid catalyst composite with at least one of zirconium tetraalkoxide and zirconium tetrahalide to yield a reaction mixture, and further reacting the reaction mixture with an organoaluminum halide, the improvement which comprises said process consisting essentially of a combination in any order of:

step (a) preparing an ethylene homopolymer or copolymer at a rate ranging from 1 to 23% by weight with respect to the total polymerization amount at a temperature of 30° C. to 80° C., said ethylenic polymer or copolymer containing an alpha-olefin other than ethylene in an amount of 10% by weight or lower and having an intrinsic viscosity [η] of 15 dl/g to 30 dl/g; and step (b) preparing an ethylene homopolymer or copolymer at a rate ranging from 77 to 99% by weight with respect to the total polymerization amount at a temperature of 60° C. to 100° C., said ethylenic polymer or copolymer containing an alpha-olefin other than ethylene in an amount of 10% by weight or lower and having an intrinsic viscosity [η] of 1.0 dl/g to 5.0 dl/g such that essentially complete polymerization is achieved after completion of steps (a) and (b) to obtain an ethylenic polymer composition having a density ranging from 0.943 g/cm$^3$ to 0.958 g/cm$^3$, an intrinsic viscosity ranging from 3.2 dl/g to 4.5 dl/g, a melt index ranging from 0.01 to 0.08 g/10 minutes useful for inflation molding and large scale blow-molding.

10. In a process for preparing an ethylenic polymer composition comprising polymerizing ethylene or ethylene with an alpha-olefin other than ethylene in the presence of a catalyst obtained from contacting a solid catalyst component obtained by contacting a mixture of magnesium alkoxide with a lower alkoxytitanium with an alkanol to form a composite, reacting the solid composite with at least one of zirconium tetraalkoxide and zirconium tetrahalide to yield a reaction mixture, and further reacting the reaction mixture with an organoaluminum halide, the improvement which comprises said process consisting of a combination in any order of:

step (a) preparing an ethylene homopolymer or copolymer at a rate ranging from 1 to 23% by weight with respect to the total polymerization amount at a temperature of 30° C. to 80° C., said ethylenic polymer or copolymer containing an alpha-olefin other than ethylene in an amount of 10% by weight or lower and having an intrinsic viscosity [η] of 15 dl/g to 30 dl/g; and step (b) preparing an ethylene homopolymer or copolymer at a rate ranging from 77 to 99% by weight with respect to the total polymerization amount at a temperature of 60° C. to 100° C., said ethylenic polymer or copolymer containing an alpha-olefin other than ethylene in an amount of 10% by weight or lower and having an intrinsic viscosity [η] of 1.0 dl/g to 5.0 dl/g, thereby producing an ethylenic polymer composition having a density ranging from 0.943 g/cm$^3$ to 0.958 g/cm$^3$, an intrinsic viscosity ranging from 3.2 dl/g to 4.5 dl/g, a melt index ranging from 0.01 to 0.08 g/10 minutes useful for inflation molding and large scale blow-molding.

11. A process as claimed in claim 9, wherein the alpha-olefin is an alpha-olefin having from 3 to 8 carbon atoms.

12. A process as claimed in claim 10, wherein the alpha-olefin is an alpha-olefin having from 3 to 8 carbon atoms.

13. A process as claimed in claim 9, wherein the alpha-olefin is butene-1.

14. A process as claimed in claim 10, wherein the alpha-olefin is butene-1.

15. A process as claimed in claim 9, wherein an ethylene homopolymer is prepared in at least one step (a) and step (b).

16. A process as claimed in claim 10, wherein an ethylene homopolymer is prepared in at least one step (a) and step (b).

* * * * *